(12) United States Patent
Liu et al.

(10) Patent No.: US 11,830,688 B2
(45) Date of Patent: Nov. 28, 2023

(54) LUMINOUS KEYBOARD AND BACKLIGHT MODULE THEREOF

(71) Applicant: Darfon Electronics Corp., Taoyuan (TW)

(72) Inventors: Hsin-Hung Liu, Taoyuan (TW); Chao-Yu Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 17/699,594

(22) Filed: Mar. 21, 2022

(65) Prior Publication Data
US 2022/0319783 A1    Oct. 6, 2022

(30) Foreign Application Priority Data
Mar. 30, 2021  (TW) ................................ 110111653

(51) Int. Cl.
*H01H 13/83* (2006.01)
*G06F 3/02* (2006.01)
*F21V 8/00* (2006.01)

(52) U.S. Cl.
CPC ........... *H01H 13/83* (2013.01); *G02B 6/0035* (2013.01); *G06F 3/021* (2013.01); *H01H 2219/062* (2013.01)

(58) Field of Classification Search
CPC ............. H01H 13/83; H01H 2219/062; H01H 2219/039; H01H 13/023; H01H 2219/06; H01H 2221/07; H01H 9/181; H01H 2219/036; H01H 2219/044; H01H 2013/026; H01H 9/16; H01H 2219/0622; H01H 2219/037
See application file for complete search history.

(56) References Cited

U.S. PATENT DOCUMENTS

| 8,770,772 B1 * | 7/2014 | Zhang ................... H01H 13/83 362/23.03 |
| 11,175,444 B1 * | 11/2021 | Pan ....................... G02B 6/0088 |
| 2014/0369067 A1 * | 12/2014 | Chen .................... G02B 6/0031 362/606 |
| 2019/0080862 A1 | 3/2019 | Chiang et al. |

FOREIGN PATENT DOCUMENTS

TW          201913704 A        4/2019

OTHER PUBLICATIONS

TW Office Action dated Jul. 20, 2022 in Taiwan application No. 110111653.

* cited by examiner

*Primary Examiner* — Ahmed M Saeed
(74) *Attorney, Agent, or Firm* — McClure, Qualey & Rodack, LLP

(57) ABSTRACT

A backlight module applicable to a key module is provided, the key module includes a plurality of key units and a baseplate, and the plurality of key units are disposed on the baseplate. The backlight module includes a lower substrate, a plurality of periphery light sources disposed along the peripheral of the baseplate, and a shielding structure. The lower substrate is disposed below the baseplate, and there is an outer edge gap between an outer edge of the baseplate and the lower substrate. The periphery light sources are disposed between the baseplate and the lower substrate. The shielding structure is disposed outside those periphery light sources distributed, to prevent light provided by the plurality of light sources from being emitted out of the outer edge gap.

8 Claims, 14 Drawing Sheets

LUMINOUS KEYBOARD AND BACKLIGHT MODULE THEREOF

TECHNICAL FIELD

The present invention relates to a luminous keyboard and a backlight module thereof.

BACKGROUND

A keyboard is a quite important input device for an electronic product (especially a computer), and the development of keyboards is closely related to the convenience of users. To operate keyboards smoothly in a dim environment, luminous keyboards have gradually become the first choice of consumers. Light is usually provided by using a backlight module in a luminous keyboard.

As shown in FIG. 1, in a conventional backlight module 80, a spacer 60, and a lower substrate 20 with a light source 30 are usually stacked to each other and fixed to a baseplate 10 of plural keyswitches (omitted) by adhesion layers 61. However, because the adhesion layers 61 are mostly made of light-transmissive materials, light emitted by the light source 30 may pass through the adhesion layers 61 to cause a light leakage phenomenon at a side edge of the backlight module 80.

Therefore, how to alleviate the light leakage phenomenon at the side edge of the backlight module is one of key points in the design of the luminous keyboard.

SUMMARY

The objective of the present invention is to provide a luminous keyboard and a backlight module thereof, to alleviate the light leakage phenomenon at the side edge of the backlight module.

The backlight module of the present invention is configured underneath a baseplate beneath a plurality of key units. The backlight module includes a lower substrate, a spacer, a plurality of periphery light sources, and a shielding structure. The lower substrate is disposed below the baseplate and includes a circuit layer, wherein there is an outer edge gap between an outer edge of the baseplate and the lower substrate. The spacer is disposed between the lower substrate and the baseplate and has at least one spacer hole. The plurality of periphery light sources connects with the circuit layer and are located within the at least one spacer hole. The plurality of periphery light sources are disposed between the baseplate and the lower substrate and are disposed along a periphery of the baseplate. Each of the periphery light sources disposed in optical communication with at least one baseplate hole of the baseplate. Light provided by each of the periphery light sources passes through a corresponding one of the baseplate holes to illuminate a corresponding one of the key units. The shielding structure is disposed outside the periphery light source to block light provided by the periphery light sources from emitting towards the outer edge gap.

In an embodiment, the backlight module further includes a light masking sheet disposed between the baseplate and the periphery light sources, wherein a portion of the light masking sheet extending out of the outer edge gap further extends upward or downward, or upward and downward respectively to form the shielding structure to shield the outer edge gap.

In an embodiment, a portion of the light masking sheet extending out of the outer edge gap further bents downward to cover underneath the lower substrate, or further bents upward to cover the outer edge gap and further extend to cover underneath the baseplate, or cover the outer edge of the baseplate, or cover above the baseplate.

In an embodiment, a shielding wall formed by a bent portion of the light masking sheet proximate to the peripheral light source is configured wide enough to block light toward at least one direction, or configured as a continuous wall surrounding all lateral sides of the peripheral light source to block lights emitted towards any directions within a range of 360 degrees.

In an embodiment, the backlight module further includes a first adhesion layer disposed on a top surface of the spacer, and includes a second adhesion layer disposed on a bottom surface of the spacer, wherein the shielding structure shields edges of the first adhesion layer and the second adhesion layer to block light.

In an embodiment, the backlight module further includes at least one light guide sheet disposed adjacent to at least one of the periphery light sources for guiding light, wherein a vertical projection of the baseline hole overlaps with the light guide sheet, and the shielding structure blocks light emitted out of a lateral side of the light guide sheet.

In an embodiment, the backlight module includes a lower substrate, a spacer, a plurality of periphery light sources, and a shielding structure. The lower substrate is disposed below the baseplate. The lower substrate includes an outer edge gap located between an outer edge of the baseplate and the lower substrate. The spacer is disposed between the lower substrate and the baseplate, and has at least one spacer hole. The plurality of periphery light sources are located within the at least one spacer hole. The periphery light source is disposed between the baseplate and the lower substrate, and is disposed along a periphery of the baseplate. The periphery light source is disposed in optical communication with at least one baseplate hole of the baseplate. Light provided by the periphery light source passes through a corresponding one of the baseplate holes to illuminate a corresponding one of the key units. The shielding structure is disposed outside the periphery light sources to block light provided by the periphery light sources emitting towards the outer edge gap. The lower substrate reflects or blocks light from the periphery light sources. The backlight module further includes a circuit layer disposed between the baseplate and the lower substrate, and electrically coupled with the periphery light sources. The lower substrate extends and covers above or underneath the outer edge of the baseplate to form the shielding structure to shield the outer edge gap.

In an embodiment, the periphery light source is disposed between the circuit layer and the lower substrate. The circuit layer includes at least one circuit layer hole. The circuit layer hole at least partially overlaps with a vertical projection of the baseplate hole.

In an embodiment, an end edge of the lower substrate covers the outer edge of the baseplate, or the end edge of the lower substrate is bent inward to insert between the baseplate and the circuit layer, or to insert between the baseplate and the spacer.

In an embodiment, the circuit layer is configured on a top surface of the lower substrate.

In an embodiment, the backlight module includes a lower substrate, at least one spacer, a plurality of periphery light sources, and a shielding structure. The lower substrate is disposed below the baseplate. The lower substrate includes an outer edge gap located between an outer edge of the baseplate and the lower substrate. The at least one spacer is disposed between the lower substrate and the baseplate, and has at least one spacer hole. The plurality of periphery light sources are located within the at least one spacer hole. The periphery light source is disposed between the baseplate and the lower substrate, and is disposed along a periphery of the baseplate. The periphery light source is disposed in optical communication with at least one baseplate hole of the baseplate. Light provided by the periphery light source passes through a corresponding said baseplate hole to illuminate a corresponding one of the key units. The shielding structure is disposed outside the periphery light source to block light provided by the periphery light source from emitting towards the outer edge gap. A portion of the spacer extends out of the outer edge gap and further extends vertically to form the shielding structure to block light of the periphery light source emitted toward the outer edge gap.

In an embodiment, the extended portion of the spacer extends downward to cover an external edge of the lower substrate, or extend s upward to cover an external edge of the baseplate, or extends both downward and upward to cover an external edge of each of the lower substrate and the baseplate.

In an embodiment, the backlight module comprises a lower substrate, at least one spacer, a plurality of periphery light sources, and a shielding structure. The lower substrate is disposed below the baseplate. The lower substrate includes an outer edge gap located between an outer edge of the baseplate and the lower substrate. The at least one spacer is disposed between the lower substrate and the baseplate, and has at least one spacer hole. The plurality of periphery light sources are located within the at least one spacer hole. The periphery light source is disposed between the baseplate and the lower substrate, and is disposed along a periphery of the baseplate. The periphery light source is disposed in optical communication with at least one baseplate hole of the baseplate. Light provided by the periphery light source passes through a corresponding one of the baseplate holes to illuminate a corresponding one of the key units. The shielding structure is disposed outside the periphery light source to block light provided by the periphery light source from emitting towards the outer edge gap. A portion of the baseplate extends downward to form the shielding structure to block light of said periphery light source emitted toward the outer edge gap.

In an embodiment, the portion of the baseplate extends out of the outer edge gap and bends downward to shield the outer edge gap.

In an embodiment, the portion of the baseplate extends from an edge of the baseplate hole to form the shielding structure adjacent to the periphery light source.

In an embodiment, the backlight module includes a lower substrate, at least one spacer, a plurality of periphery light sources, and a shielding structure. The lower substrate is disposed below the baseplate. The lower substrate includes an outer edge gap located between an outer edge of the baseplate and the lower substrate. The at least one spacer is disposed between the lower substrate and the baseplate, and has at least one spacer hole. The plurality of periphery light sources are located within the at least one spacer hole. The periphery light source is disposed between the baseplate and the lower substrate, and is disposed along a periphery of the baseplate. The periphery light source is disposed in optical communication with at least one baseplate hole of the baseplate. Light provided by the periphery light source passes through a corresponding one of the baseplate holes to illuminate a corresponding one of the key units. The shielding structure is disposed outside the periphery light source to block light provided by the periphery light source from emitting towards the outer edge gap. The at least two adhesion layers are disposed on the at least one space. At least one air gap is located between the at least two adhesion layers to form the shielding structure to shield the outer edge gap.

In an embodiment, the shielding structure includes at least two said spacers aligned in series toward the outer edge gap while shifted from each other without locating on a same straight line.

In an embodiment, the at least two adhesion layers are disposed outside the periphery light source. The at least two adhesion layers are aligned in series toward the outer edge gap while shifted from each other without locating on a same straight line.

In an embodiment, at least one of said spacer and the adhesion layers are opaque to block light.

The luminous keyboard of the present invention includes a key module and the backlight module. The key module includes the plurality of key units and the baseplate, wherein the plurality of key units are disposed on the baseplate.

DETAILED DESCRIPTION

Figure 1:
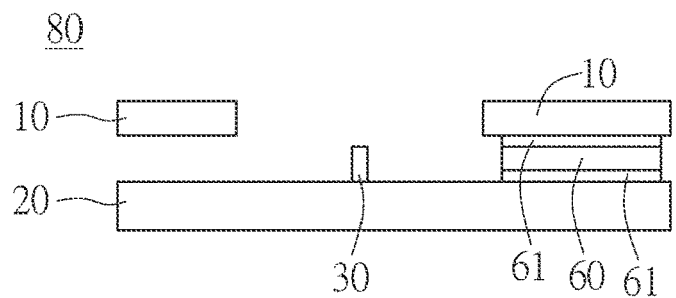
FIG. 1 is a schematic diagram of the prior art.

The present invention provides a luminous keyboard and a backlight module thereof, to prevent light from leaking at a side edge of the backlight module. The luminous keyboard of the present invention is applicable to a notebook computer, a standalone keyboard or any other electrical device with an imbedded keyboard module, but is not limited thereto. In an embodiment shown in FIG. 2, a luminous keyboard 900 includes the key module 700 and the backlight module 801. The key module 700 includes a plurality of key units 170, and a baseplate 100 disposed under the key units 170. The baseplate 100 is used as a support member of the key units 170. Generally, each of the key units 170 includes a keycap and a pair of supports (both not marked in FIG. 2) with the supports (scissor-type supports for example) being movably connected between the keycap and the baseplate 100 to support upward and downward movement of the keycaps. A membrane circuit (not shown) of the key units 170 may be configured above or underneath the baseplate 100 to generate key signals upon keystrokes of the key units 170. Baseplate holes 110 may be provided on the baseplate 100 (when embodied by an opaque material) corresponding to each key units 170, to allow light to pass toward the key units 170 and provide heat dissipation, or allow insertion of external fasteners (for example, screws and bolts).

Figure 2:
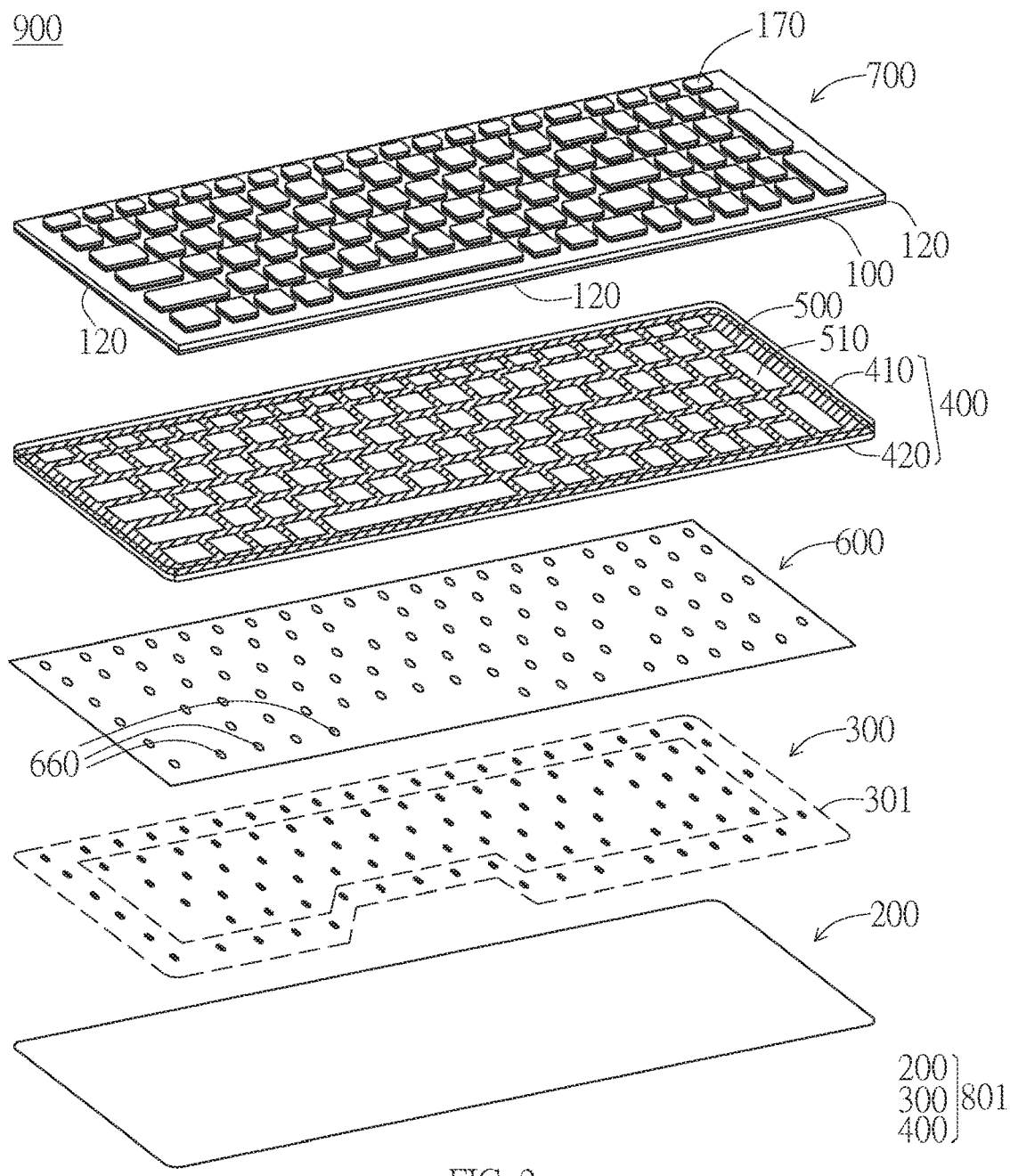
FIG. 2 is a schematic diagram of an embodiment of a luminous keyboard according to the present invention.

Specifically, in the embodiment shown in FIG. 2, the backlight module 801 includes a lower substrate 200, a plurality of light sources 300, a spacer 600 and a shielding structure 400. The lower substrate 200 is disposed below the baseplate 100, and the light sources 300 are disposed between the baseplate 100 and the lower substrate 200. In an embodiment shown in FIG. 3A, there is an outer edge gap 101 between an outer edge 120 of the baseplate 100 and the lower substrate 200. From a different point of view, the outer edge gap 101 is a gap between a portion of a surrounding side edge of the baseplate 100 and the lower substrate 200. The shielding structure 400 is disposed outside those of the light sources 300 distributed on a periphery (namely, light sources distributed on the periphery; those disposed along the inner peripheral of the baseplate may be deemed as periphery light sources 400), which is at one side relative to the outer edge 120 of the adjacent baseplate 100 to prevent light provided by the light sources 300 from being emitted out of the outer edge gap 101. The periphery light sources 300 are disposed at the periphery, which is a peripheral region 301 (referring to FIG. 2) close to a peripheral of the baseplate 100; each of the periphery light sources 300 is disposed in optical communication with at least one of the baseplate holes 110. In different embodiments, the shielding structure 400 is disposed at one side of the those of the periphery light sources 300 distributed on the periphery toward the outer edge gap 101, and may be located between a light source 300 and the outer edge gap 101, in the outer edge gap 101, or at the outer side of the entire backlight module 801.

Figure 3A:
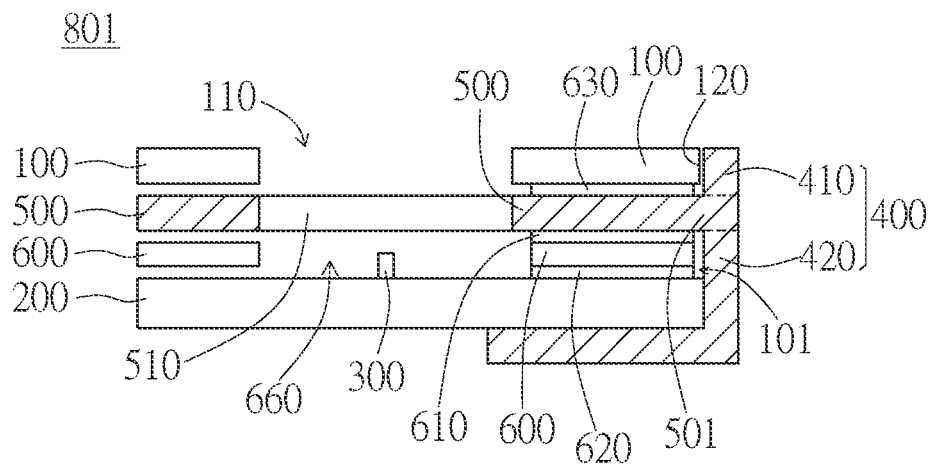
FIG. 3A and FIG. 3B are schematic diagrams of a first embodiment of a backlight module according to the present invention.

More specifically, in the embodiment shown in FIG. 3A, the lower substrate 200 includes a circuit layer coupled to the light source 300. The backlight module 801 further includes a light masking sheet 500 disposed between the baseplate 100 and the light source 300. A portion of the light masking sheet 500 extending out of the outer edge gap 101 then extends upward and downward respectively to form the shielding structure 400 to shield the outer edge gap 101. From a different point of view, the shielding structure 400 is connected to an end portion 501 of the light masking sheet 500 that extends out of the outer edge gap 101, the end portion 501 extends upward to form an upper masking portion 410 to shield a portion of the outer edge gap 101 which is located between the light masking sheet 500 and the baseplate 100, and the end portion 501 extends downward to form a lower masking portion 420 to shield a portion of the outer edge gap 101 which is located between the light masking sheet 500 and the lower substrate 200. In this way, the shielding structure 400 can prevent the light emitted by the light source 300 from being emitted out of the outer edge gap 101, that is, prevent the light from leaking at a side edge of the backlight module 801. Based on considerations such as increasing the masking effect or improving the mechanical strength, an end edge of the shielding structure 400, namely, an end edge of the lower masking portion 420, which is formed by the light masking sheet 500 extending out of the outer edge gap 101 and then extending downward, may be further bent inward below the lower substrate 200. That is, in this embodiment, the shielding structure 400 is formed by extension of the light masking sheet 500, and the corresponding upper masking portion 410 and lower masking portion 420 are formed by using bumping and bending techniques.

In the embodiment shown in FIG. 3A, the spacer 600 disposed between the light masking sheet 500 and the lower substrate 200, may only be located between those periphery light sources 300 distributed on the periphery and the outer edge 120 of the baseplate 100. As shown in FIG. 2, in some circumstances, each of the light sources 300 may be disposed in plural spacer holes 660 respectively, so as to protect light sources 300, and prevent light sources 300 from entering into baseplate holes 110 to interfere with any elements of key units 170, such as scissors supports, keycap hooks or membrane circuit components. For non-peripheral region, it is possible that multiple light sources 300 share one larger spacer hole 660. A first adhesion layer 610 is disposed between the light masking sheet 500 and the spacer 600, a second adhesion layer 620 is disposed between the spacer 600 and the lower substrate 200, and a third adhesion layer 630 is disposed between the baseplate 100 and the light masking sheet 500. Further, a common adhesion layer is made of a light-transmissive material, and light emitted by a light source may pass through the adhesion layer. The shielding structure 400 can prevent the light emitted by the light source 300 and passing through the first adhesion layer 610, the second adhesion layer 620, and the third adhesion layer 630 from being further emitted out of the outer edge gap 101 to outside of the side edge of the backlight module 801 (namely, prevent the light from leaking at a side edge of the luminous keyboard). The first adhesion layer 610, the second adhesion layer 620, and the third adhesion layer 630 may be further made of a light-proof material, to reduce light to pass through.

In the embodiments shown in FIG. 2 and FIG. 3A, the baseplate 100 is provided with a plurality of baseplate holes 110, and the light masking sheet 500 is provided with a plurality of light-transmissive portions 510. The light masking sheets 500 may be formed by printing ink on a film, and define the light-transmissive portions 510. Vertical projections of the periphery light sources 300 and the light-transmissive portions 510 on the baseplate 100 overlap with the baseplate holes 110. In other words, each baseplate hole 110 respectively corresponds to one light-transmissive portion 510 and one light source 300 below. However, in different embodiments, based on considerations such as increasing a light-exiting area and improving the light-exiting uniformity, the light source 300 may be used with a light guide element, and may not be disposed right below the baseplate hole 110 and the light-transmissive portion 510. In the drawings of FIGS. 3A/3B/3C/3D, 4A/4B, 5A/5B, 6A/6B, 7A/7B, 8A/8B, 9A/9B, 10A/10B, 11A/11B, 12A/12B, 13A/13B and 14A/14B, the range of the illustrated baseplate 100 and baseplate hole 110 and light source 300 corresponds to a single key unit 170. Although only one baseplate hole 110 is shown in these drawings, there may be plural baseplate holes 110 underneath a contour of a single key unit 170.

Figure 3B:
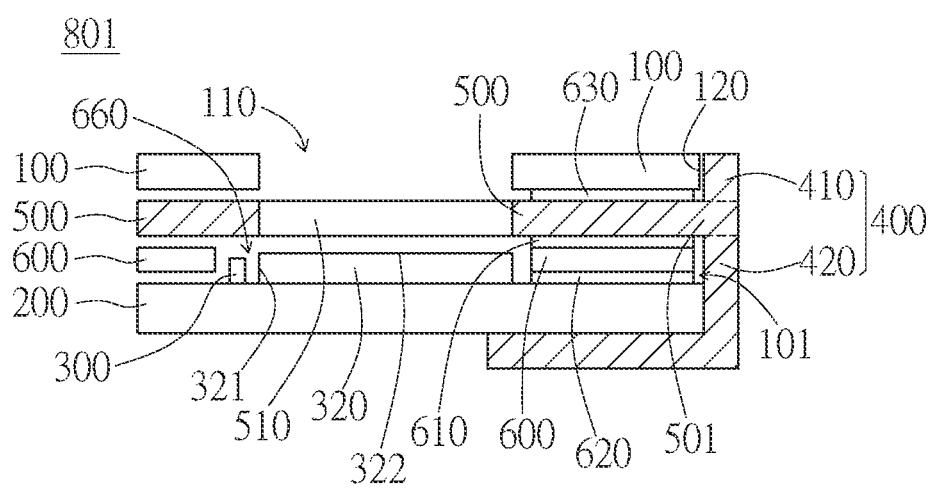

More specifically, in the embodiment shown in FIG. 3B, the backlight module 801 further includes a plurality of light guide sheets 320 (or an integrated one) respectively disposed at one side of one of the light sources 300 (namely, each light guide sheet 320 is disposed at one side of one of the light sources 300). Vertical projections of the each light guide sheet 320 and a corresponding light-transmissive portion 510 on the baseplate 100 overlap with a corresponding baseplate hole 110. In other words, each baseplate hole 110 respectively corresponds to one light-transmissive portion 510 and one light guide sheet 320 below. The light provided by the light source 300 is respectively emitted in from a side face 321 of an adjacent light guide sheet 320 and emitted out from a top face 322.

In different embodiments, the shielding structure 400 may vary according to considerations such as usage or manufacturing. In an embodiment shown in FIG. 3C and FIG. 3D, a lower substrate 200 is a circuit layer coupled to a light source 300, and a backlight module 802 further includes a light masking sheet 500 disposed between a baseplate 100 and the light source 300. The light masking sheet 500 is bent in an outer edge gap 101 to form a shielding structure 400 by using, for example, bumping and bending techniques.

Figure 3C:
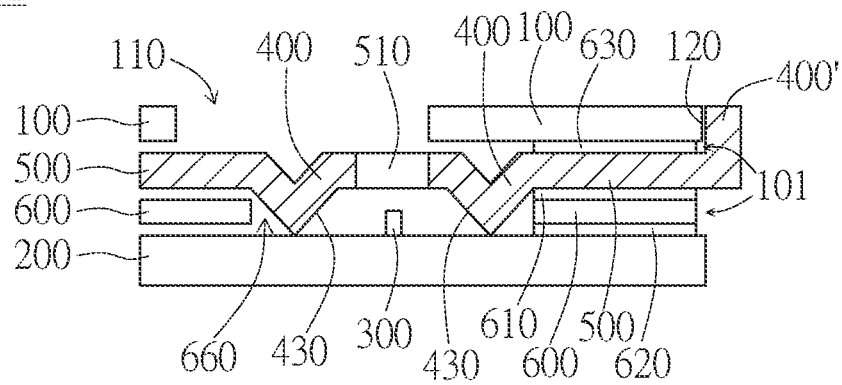
FIG. 3C and FIG. 3D are schematic diagrams of a second embodiment of a backlight module according to the present invention.

In the embodiment shown in FIG. 3C, the light masking sheet 500 is bent up and down in the outer edge gap 101 to form the shielding structure 400 (also referred to as a first shielding structure) with a V/U-shaped cross-section. The shielding structure 400 (namely, the first shielding structure) has an inclined shielding wall 430 facing toward the light source 300. The shielding wall 430 formed by a bent portion of the masking sheet 500 proximate to the peripheral light source 300 may be wide enough to block light toward one direction, or may selectively be a continuous wall surrounding all lateral sides of the peripheral light source 300 to block lights emitted towards any directions within a range of 360 degrees. Such shielding wall 430 may be disposed within the spacer hole 660. In this way, the shielding structure 400 (namely, the first shielding structure) can prevent light emitted by the light source 300 from being emitted out of the outer edge gap 101, that is, prevent the light from leaking at a side edge of the backlight module 802. Based on considerations such as increasing the masking effect or improving the mechanical strength, a manner in which the light masking sheet 500 is bent to form the shielding structure 400 (namely, the first shielding structure) may vary in different ways. On the other hand, because the shielding structure 400 (namely, the first shielding structure) is mainly formed between the light masking sheet 500 and the lower substrate 200 in this embodiment, a portion of the light masking sheet 500 extending out of the outer edge gap 101 may further extend upward to form a shielding structure 400' (also referred to as a second shielding structure) to shield a portion of the outer edge gap 101 which is located between the light masking sheet 500 and the baseplate 100, and prevent the light from being emitted out from a gap between the light masking sheet 500 and the baseplate 100. In this embodiment, the light masking sheet 500 is bent at both sides of the light source 300 to form the shielding structure 400 (namely, the first shielding structure). However, in different embodiments, the light masking sheet 500 may also be bent at only one side of the light source 300 to form the shielding structure 400 (namely, the first shielding structure).

In the embodiment shown in FIG. 3C, the backlight module 802 further includes a spacer 600, disposed between the light masking sheet 500 and the lower substrate 200, and located between the shielding structure 400 and an outer edge 120 of the baseplate 100. A first adhesion layer 610 is disposed between the light masking sheet 500 and the spacer 600, a second adhesion layer 620 is disposed between the spacer 600 and the lower substrate 100, and a third adhesion layer 630 is disposed between the baseplate 100 and the light masking sheet 500. Further, a common adhesion layer is made of a light-transmissive material, and light emitted by a light source may pass through the adhesion layer. The shielding structure 400 can prevent the light emitted by the light source 300 from passing through the first adhesion layer 610 and the second adhesion layer 620 and being emitted out from the outer edge gap 101 to outside of the side edge of the backlight module 802. The shielding structure 400' can prevent the light emitted by the light source 300 from passing through the third adhesion layer 630 and being emitted out from the outer edge gap 101 to outside of the side edge of the backlight module 802. The first adhesion layer 610, the second adhesion layer 620, and the third adhesion layer 630 may be further made of a light-proof material, to reduce light to pass through.

In the embodiment shown in FIG. 3C, the baseplate 100 is provided with a plurality of baseplate holes 110, and the light masking sheet 500 is provided with a plurality of light-transmissive portions 510. The light masking sheets 500 may be formed by printing ink on a film, and define the light-transmissive portions 510. Vertical projections of the light sources 300 and the light-transmissive portions 510 on the baseplate 100 overlap with the baseplate holes 110. In other words, each baseplate hole 110 respectively corresponds to one light-transmissive portion 510 and one light source 300 below. However, in different embodiments, based on considerations such as increasing a light-exiting area and improving the light-exiting uniformity, the light source 300 may be used with a light guide element, and may not be disposed right below the baseplate hole 110 and the light-transmissive portion 510.

Figure 3D:
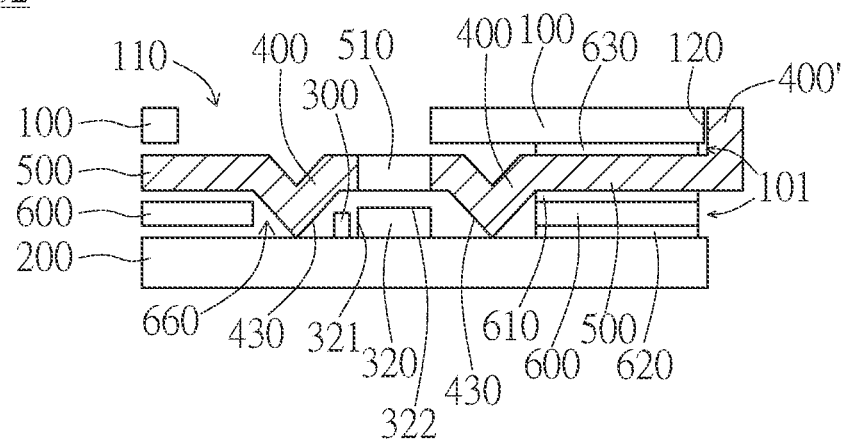

More specifically, in the embodiment shown in FIG. 3D, the backlight module 802 further includes a plurality of light guide sheets 320 (or an integrated one) respectively disposed at one side of one of the light sources 300, and vertical projections of each light guide sheet 320 and a corresponding light-transmissive portion 510 on the baseplate 100 overlap with a corresponding baseplate hole 110. In other words, each baseplate hole 110 respectively corresponds to one light-transmissive portion 510 and one light guide sheet 320 below. The light provided by the light source 300 is respectively emitted in from a side face 321 of an adjacent light guide sheet 320 and emitted out from a top face 322.

In different embodiments shown in FIG. 4A to FIG. 5B, a lower substrate 200 is a light reflector, to support upward reflection of light emitted by a light source 300. A backlight module 803 further includes a circuit layer 220 disposed between a baseplate 100 and a plurality of light sources 300 and coupled to the light sources 300. The lower substrate 200 extends toward an outer edge 120 of the baseplate 100 to form a shielding structure 400 to shield an outer edge gap 101.

Figure 4A:
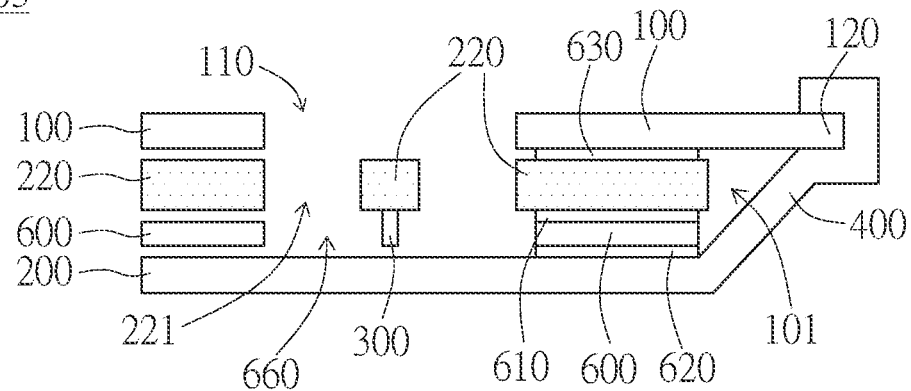
FIG. 4A and FIG. 4B are schematic diagrams of a third embodiment of a backlight module according to the present invention.

More specifically, in an embodiment shown in FIG. 4A, the lower substrate 200 extends toward the outer edge 120 of the baseplate 100 to form a shielding structure 400 with an inclined surface to shield the outer edge gap 101. In this way, the shielding structure 400 can prevent the light emitted by the light source 300 from being emitted out of the outer edge gap 101, that is, prevent the light from leaking at a side edge of a backlight module 803. Based on considerations such as increasing the masking effect or improving the mechanical strength, an end edge of the shielding structure 400 may be further formed by bending by using a bending technology and cover the outer edge 120 of the baseplate 100.

In the embodiment shown in FIG. 4A, the backlight module 803 further includes a spacer 600, disposed between the circuit layer 220 and the lower substrate 200, and located between those periphery light sources 300 distributed on a periphery and the outer edge 120 of the baseplate 100. A first adhesion layer 610 is disposed between the circuit layer 220 and the spacer 600, a second adhesion layer 620 is disposed between the spacer 600 and the lower substrate 200, and a third adhesion layer 630 is disposed between the baseplate 100 and the circuit layer 220. Further, a common adhesion layer is made of a light-transmissive material, and light emitted by a light source may pass through the adhesion layer. The shielding structure 400 can prevent the light emitted by the light source 300 and passing through the first adhesion layer 610, the second adhesion layer 620, and the third adhesion layer 630 from being further emitted out from the outer edge gap 101 to outside of the side edge of the backlight module 803. The first adhesion layer 610, the second adhesion layer 620, and the third adhesion layer 630 may be further made of a light-proof material, to reduce light to pass through.

In the embodiment shown in FIG. 4A, the baseplate 100 is provided with a plurality of baseplate holes 110, and the circuit layer 220 is provided with a plurality of circuit layer holes 221. For example, the circuit layer hole 221 may be formed in a breaching manner. Vertical projections of the periphery light sources 300 and the circuit layer holes 221 on the baseplate 100 overlap with the baseplate holes 110. In other words, each baseplate hole 110 respectively corresponds to one circuit layer hole 221 and one light source 300 below. However, in different embodiments, based on considerations such as increasing the light-exiting area and improving the light-exiting uniformity, the light source 300 may be used with a light guide element, and may not be disposed right below the baseplate hole 110 and the circuit layer hole 221.

Figure 4B:
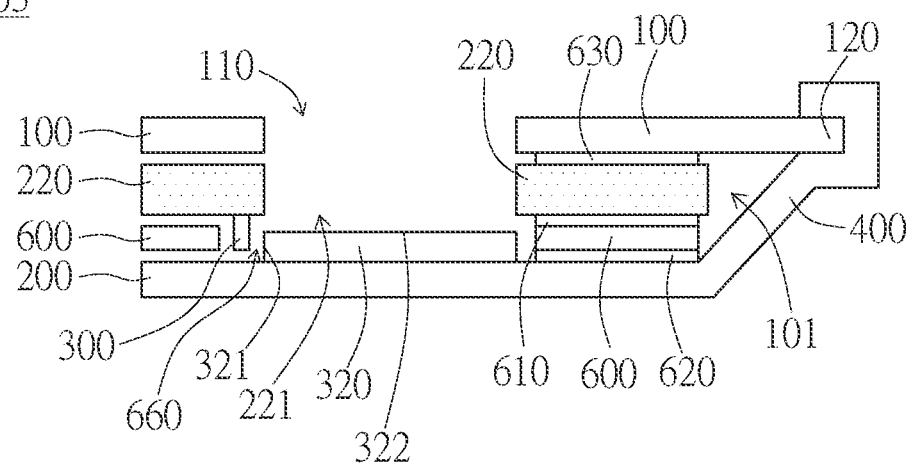
Figure 5A:
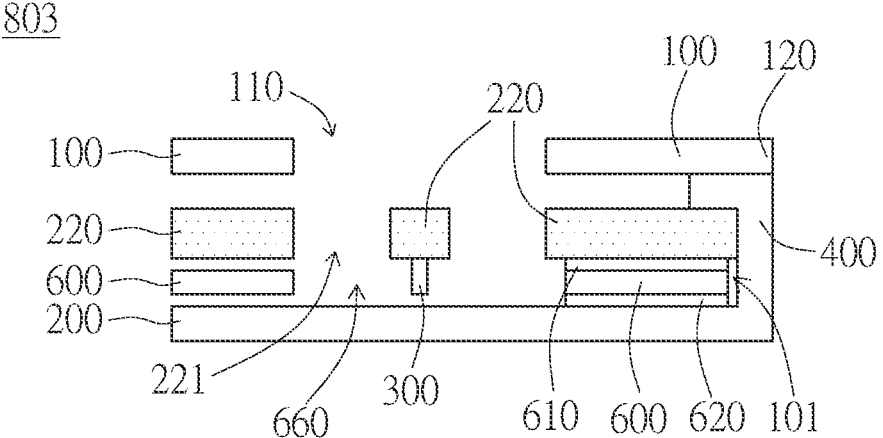
FIG. 5A and FIG. 5B are schematic diagrams of a fourth embodiment of a backlight module according to the present invention.
Figure 5B:
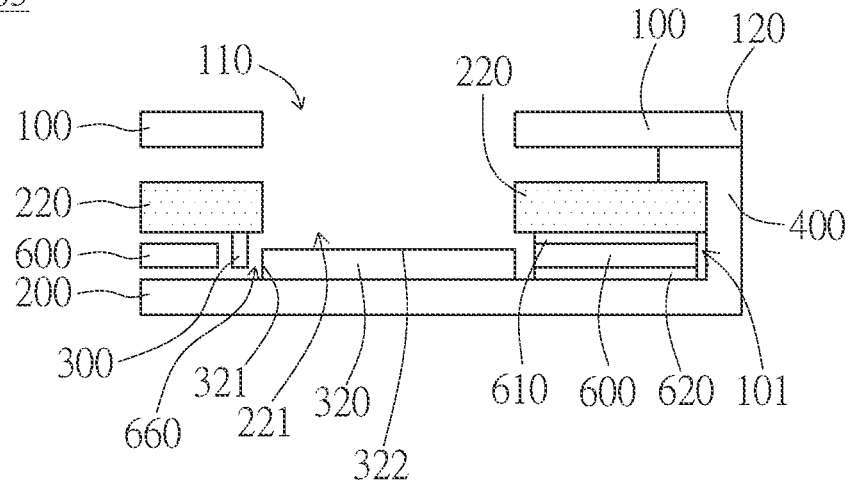

More specifically, in the embodiment shown in FIG. 4B, the backlight module 803 further includes a plurality of light guide sheets 320 (or an integrated one) respectively disposed at one side of one of the light sources 300, and a vertical projection of each light guide sheet 320 on the circuit layer 220 overlaps with a corresponding circuit layer hole 221. In other words, each baseplate hole 110 respectively corresponds to one circuit layer hole 221 and one light guide sheet 320 below. The light provided by the light source 300 is respectively emitted in from a side face 321 of an adjacent light guide sheet 320 and emitted out from a top face 322.

A manner in which the lower substrate 200 extends toward the outer edge 120 of the baseplate 100 to form the shielding structure 400 may vary according to considerations such as usage or manufacturing. In an embodiment shown in FIG. 5A and FIG. 5B, an end edge of the shielding structure 400 is bent inward to extend between the baseplate 100 and the circuit layer 220. More specifically, a portion of the lower substrate 200 extending out of the outer edge gap 101 then extends upward to form the shielding structure 400 to shield the outer edge gap 101. In this way, the shielding structure 400 can prevent the light emitted by the light source 300 from being emitted out of the outer edge gap 101, that is, prevent the light from leaking at a side edge of a backlight module 803. Based on considerations such as increasing the masking effect or improving the mechanical strength, the end edge of the shielding structure 400 may be further bent inward to extend between the baseplate 100 and the circuit layer 220 by using, for example, bumping and bending techniques.

In different embodiments shown in FIG. 6A to FIG. 7B, a lower substrate 200 is a circuit layer coupled to a plurality of light sources 300, and an upper end edge 401 and a lower end edge 402 of a shielding structure 400 are respectively connected to a baseplate 100 and the lower substrate 200. More specifically, in an embodiment shown in FIG. 6A, the shielding structure 400 may be an electrical element or a non-electrical element such as a zero-ohm resistor, and is connected to the lower substrate 200 in a mounting manner and abuts against the baseplate 100, but is not limited thereto. In this way, the shielding structure 400 can prevent the light emitted by the light source 300 from being emitted out of the outer edge gap 101, that is, prevent the light from leaking at a side edge of a backlight module 804.

Figure 6A:
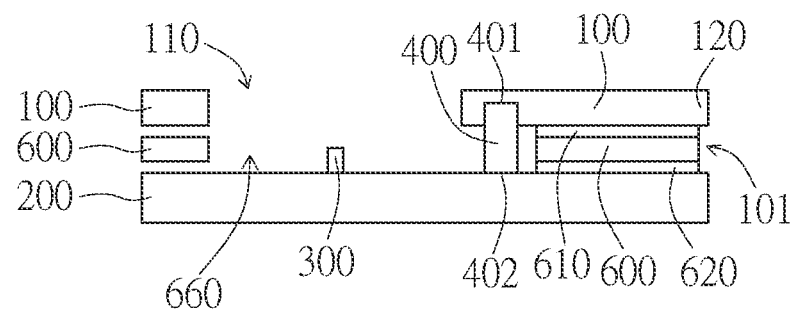
FIG. 6A and FIG. 6B are schematic diagrams of a fifth embodiment of a backlight module according to the present invention.

In the embodiment shown in FIG. 6A, the backlight module 804 further includes a spacer 600, disposed between the baseplate 100 and the lower substrate 200, and located between the shielding structure 400 and an outer edge 120 of the baseplate 100. A first adhesion layer 610 is disposed between the baseplate 100 and the spacer 600, and a second adhesion layer 620 is disposed between the spacer 600 and the lower substrate 200. Further, a common adhesion layer is made of a light-transmissive material, and light emitted by a light source may pass through the adhesion layer. The shielding structure 400 can prevent the light emitted by the light source 300 from passing through the first adhesion layer 610 and the second adhesion layer 620 and being emitted out from the outer edge gap 101 to outside of the side edge of the backlight module 804. The first adhesion layer 610 and the second adhesion layer 620 may be further made of a light-proof material, to reduce light to pass through.

In the embodiment shown in FIG. 6A, the baseplate 100 is provided with a plurality of baseplate holes 110, and vertical projections of the light sources 300 on the baseplate 100 overlap with the baseplate holes 110. In other words, each baseplate hole 110 respectively corresponds to one light source 300 below. However, in different embodiments, based on considerations such as increasing the light-exiting area and improving the light-exiting uniformity, the light source 300 may be used with a light guide element, and may not be disposed right below the baseplate hole 110.

Figure 6B:
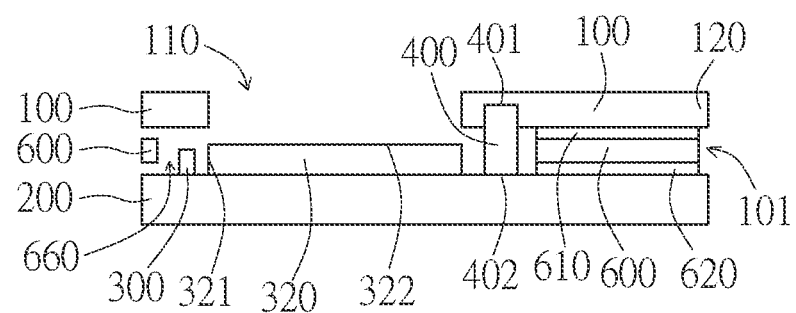

More specifically, in the embodiment shown in FIG. 6B, the backlight module 804 further includes a plurality of light guide sheets 320 (or an integrated one) respectively disposed at one side of one of the light sources 300. A vertical projection of each light guide sheet 320 on the baseplate 100 overlaps with a corresponding baseplate hole 110. In other words, each baseplate hole 110 respectively corresponds to one light guide sheet 320 below. The light provided by the light source 300 is respectively emitted in from a side face 321 of an adjacent light guide sheet 320 and emitted out from a top face 322.

Figure 7A:
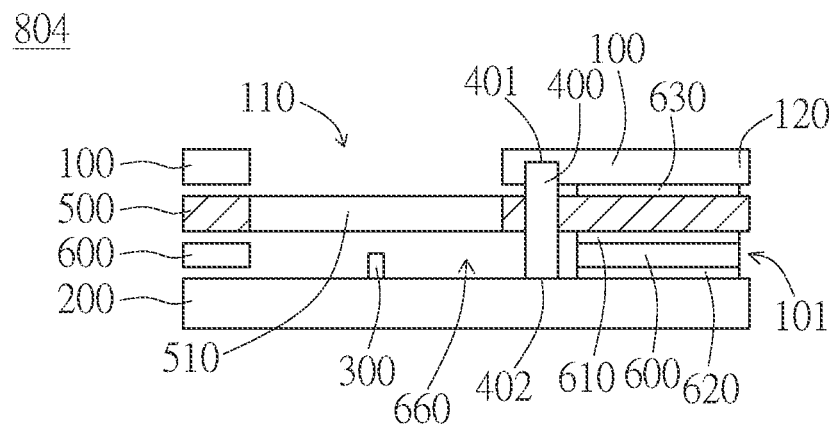
FIG. 7A and FIG. 7B are schematic diagrams of a sixth embodiment of a backlight module according to the present invention.
Figure 7B:
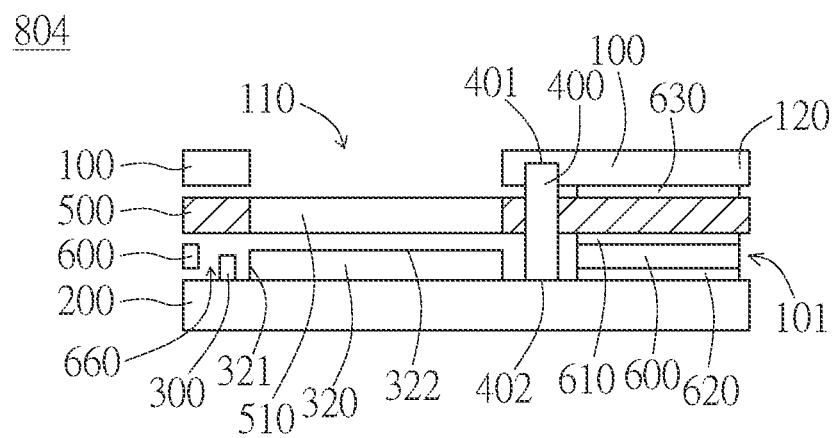

In an embodiment shown in FIG. 7A and FIG. 7B, the backlight module 804 further includes a light masking sheet 500 disposed between the baseplate 100 and the spacer 600 and located above the light sources 300. The shielding structure 400 penetrates the light masking sheet 500 so that the upper end edge 401 and the lower end edge 402 are respectively connected to the baseplate 100 and the lower substrate 200.

In the embodiment shown in FIG. 7A, the spacer 600 is disposed between the light masking sheet 500 and the lower substrate 200, and is located between the shielding structure 400 and the outer edge 120 of the baseplate 100. A first adhesion layer 610 is disposed between the light masking sheet 500 and the spacer 600, a second adhesion layer 620 is disposed between the spacer 600 and the lower substrate 200, and a third adhesion layer 630 is disposed between the baseplate 100 and the light masking sheet 500. Further, a common adhesion layer is made of a light-transmissive material, and light emitted by a light source may pass through the adhesion layer. The shielding structure 400 can prevent the light emitted by the light source 300 from passing through the first adhesion layer 610, the second adhesion layer 620, and the third adhesion layer 630 and being emitted out from the outer edge gap 101 to outside of the side edge of the backlight module 804. The first adhesion layer 610, the second adhesion layer 620, and the third adhesion layer 630 may be further made of a light-proof material, to reduce light to pass through.

In the embodiment shown in FIG. 7A, the baseplate 100 is provided with a plurality of baseplate holes 110, and the light masking sheet 500 is provided with a plurality of light-transmissive portions 510. The light masking sheets 500 may be formed by printing ink on a film, and define the light-transmissive portions 510. Vertical projections of the light sources 300 and the light-transmissive portions 510 on the baseplate 100 overlap with the baseplate holes 110. In other words, each baseplate hole 110 respectively corresponds to one light-transmissive portion 510 and one light source 300 below. However, in different embodiments, based on considerations such as increasing a light-exiting area and improving the light-exiting uniformity, the light source 300 may be used with a light guide element, and may not be disposed right below the baseplate hole 110 and the light-transmissive portion 510.

More specifically, in the embodiment shown in FIG. 7B, the backlight module 804 further includes a plurality of light guide sheets 320 (or an integrated one) respectively disposed at one side of one of the light sources 300. Vertical projections of a light guide sheet 320 and a light-transmissive portion 510 on the baseplate 100 overlap with the baseplate hole 110. In other words, each baseplate hole 110 respectively corresponds to one light-transmissive portion 510 and one light guide sheet 320 below. The light provided by the light source 300 is respectively emitted in from a side face 321 of an adjacent light guide sheet 320 and emitted out from a top face 322.

Figure 8A:
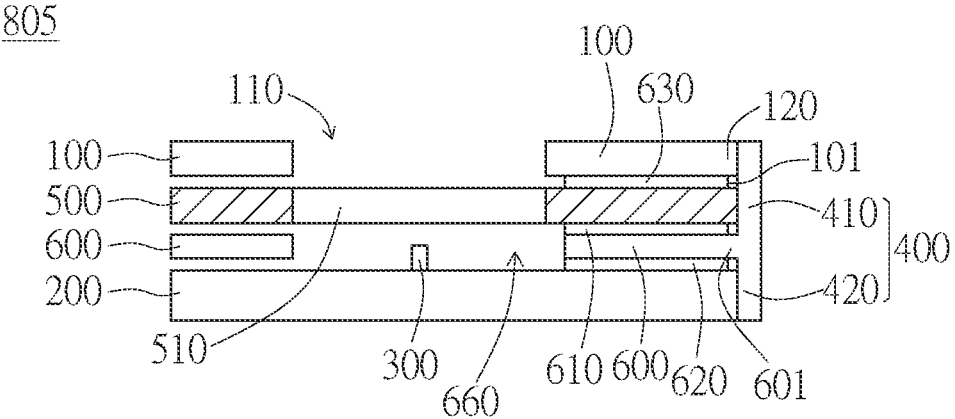
FIG. 8A and FIG. 8B are schematic diagrams of a seventh embodiment of a backlight module according to the present invention.
Figure 8B:
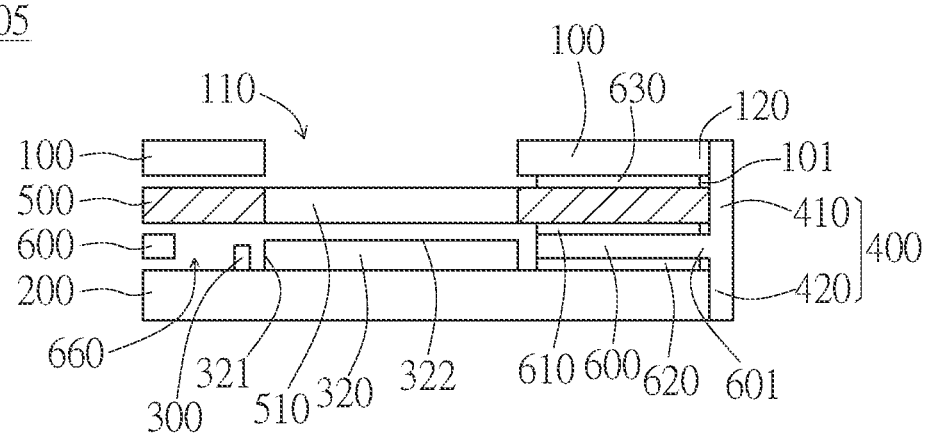

In different embodiments shown in FIG. 8A and FIG. 8B, a backlight module 805 further includes a spacer 600 disposed between a baseplate 100 and a lower substrate 200, and located between those of a plurality of light sources 300 distributed on a periphery and an outer edge 120 of the baseplate 100. A portion of the spacer 600 extending out of an outer edge gap 101 then extends upward and downward respectively to form a shielding structure 400 to shield the outer edge gap 101. From a different point of view, the shielding structure 400 is connected to an end portion 601 of the spacer 600 which extends out of the outer edge gap 101, the end portion 601 extends upward to form an upper masking portion 410 to shield a portion of the outer edge gap 101 which is located between the spacer 600 and the baseplate 100, and the end portion 601 extends downward to form a lower masking portion 420 to shield a portion of the outer edge gap 101 which is located between the spacer 600 and the lower substrate 200. That is, in this embodiment, the shielding structure 400 is formed by extension of the spacer 600, and the corresponding upper masking portion 410 and lower masking portion 420 are formed by using bumping and bending techniques. In this way, the shielding structure 400 can prevent the light emitted by the light source 300 from being emitted out of the outer edge gap 101, that is, prevent the light from leaking at a side edge of a backlight module 805.

In an embodiment shown in FIG. 8A, the backlight module 805 further includes a light masking sheet 500 disposed between the baseplate 100 and the spacer 600 and located above the periphery light sources 300. A first adhesion layer 610 is disposed between the light masking sheet 500 and the spacer 600, a second adhesion layer 620 is disposed between the spacer 600 and the lower substrate 200, and a third adhesion layer 630 is disposed between the baseplate 100 and the light masking sheet 500. Further, a common adhesion layer is made of a light-transmissive material, and light emitted by a light source may pass through the adhesion layer. The shielding structure 400 can prevent the light emitted by the light source 300 and passing through the first adhesion layer 610, the second adhesion layer 620, and the third adhesion layer 630 from being further emitted out from the outer edge gap 101 to outside of the side edge of the backlight module 805. The first adhesion layer 610, the second adhesion layer 620, and the third adhesion layer 630 may be further made of a light-proof material, to reduce light to pass through.

In the embodiment shown in FIG. 8A, the baseplate 100 is provided with a plurality of baseplate holes 110, and the light masking sheet 500 is provided with a plurality of light-transmissive portions 510. The light masking sheets 500 may be formed by printing ink on a film, and define the light-transmissive portions 510. Vertical projections of the light sources 300 and the light-transmissive portions 510 on the baseplate 100 overlap with the baseplate holes 110. In other words, each baseplate hole 110 respectively corresponds to one light-transmissive portion 510 and one light source 300 below. However, in different embodiments, based on considerations such as increasing a light-exiting area and improving the light-exiting uniformity, the light source 300 may be used with a light guide element, and may not be disposed right below the baseplate hole 110 and the light-transmissive portion 510.

More specifically, in the embodiment shown in FIG. 8B, the backlight module 805 further includes a plurality of light guide sheets 320 (or an integrated one) respectively disposed at one side of one of the light sources 300. Vertical projections of the each light guide sheet 320 and a corresponding light-transmissive portion 510 on the baseplate 100 overlap with a corresponding baseplate hole 110. In other words, each baseplate hole 110 respectively corresponds to one light-transmissive portion 510 and one light guide sheet 320 below. The light provided by the light source 300 is respectively emitted in from a side face 321 of an adjacent light guide sheet 320 and emitted out from a top face 322.

In different embodiments shown in FIG. 9A to FIG. 10B, a portion of a baseplate 100 extends downward to form a shielding structure 400. More specifically, in an embodiment shown in FIG. 9A, a portion of the baseplate 100 extending out of an outer edge gap 101 then extends downward to form the shielding structure 400 to shield the outer edge gap 101. In this way, the shielding structure 400 can prevent the light emitted by the light source 300 from being emitted out of the outer edge gap 101, that is, prevent the light from leaking at a side edge of a backlight module 806.

Figure 9A:
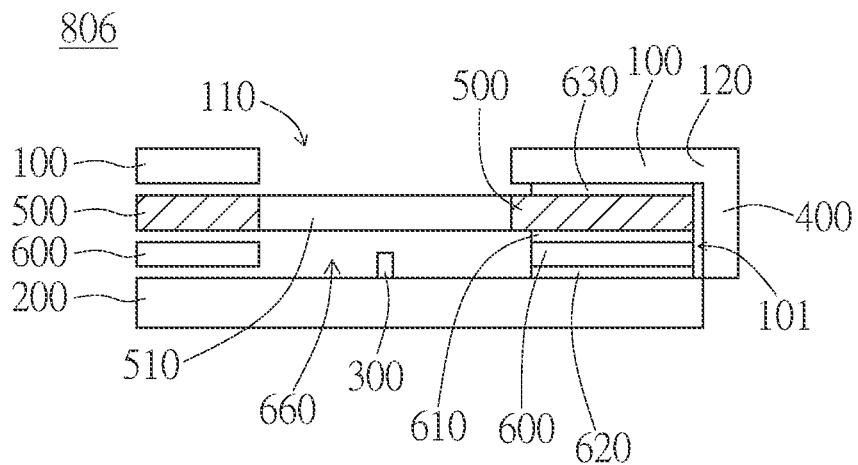
FIG. 9A and FIG. 9B are schematic diagrams of an eighth embodiment of a backlight module according to the present invention.

In the embodiment shown in FIG. 9A, the backlight module 806 further includes a spacer 600, disposed between the baseplate 100 and a lower substrate 200, and located between those periphery light sources 300 distributed on a periphery and an outer edge 120 of the baseplate 100. A first adhesion layer 610 is disposed between the light masking sheet 500 and the spacer 600, a second adhesion layer 620 is disposed between the spacer 600 and the lower substrate 200, and a third adhesion layer 630 is disposed between the baseplate 100 and the light masking sheet 500. Further, a common adhesion layer is made of a light-transmissive material, and light emitted by a light source may pass through the adhesion layer. The shielding structure 400 can prevent the light emitted by the light source 300 and passing through the first adhesion layer 610, the second adhesion layer 620, and the third adhesion layer 630 from being further emitted out from the outer edge gap 101 to outside of the side edge of the backlight module 806. The first adhesion layer 610, the second adhesion layer 620, and the third adhesion layer 630 may be further made of a light-proof material, to reduce light to pass through.

In the embodiment shown in FIG. 9A, the baseplate 100 is provided with a plurality of baseplate holes 110, and the light masking sheet 500 is provided with a light-transmissive portions 510. The light masking sheets 500 may be formed by printing ink on a film, and define the light-transmissive portions 510. Vertical projections of the light sources 300 and the light-transmissive portions 510 on the baseplate 100 overlap with the baseplate holes 110. In other words, each baseplate hole 110 respectively corresponds to one light-transmissive portion 510 and one light source 300 below. However, in different embodiments, based on considerations such as increasing a light-exiting area and improving the light-exiting uniformity, the light source 300 may be used with a light guide element, and may not be disposed right below the baseplate hole 110 and the light-transmissive portion 510.

Figure 9B:
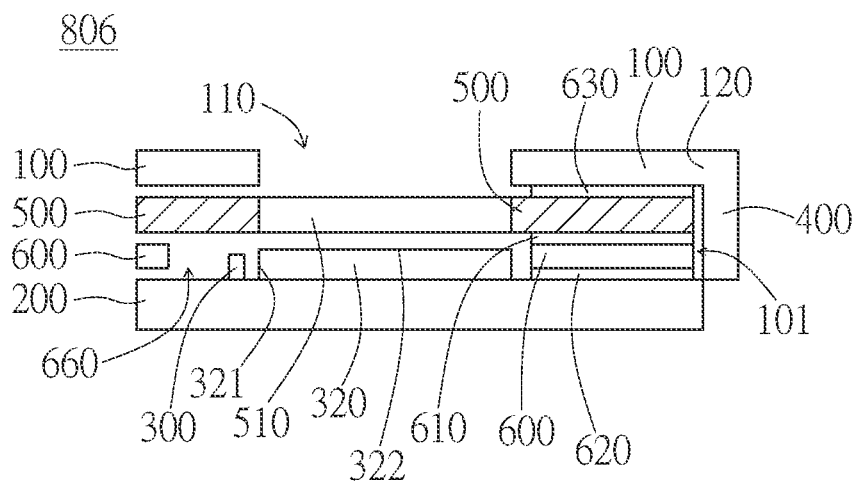
Figure 10A:
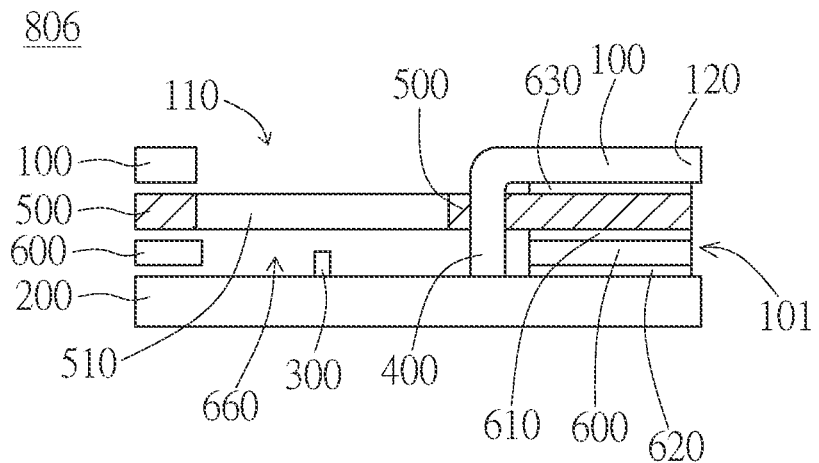
FIG. 10A and FIG. 10B are schematic diagrams of a ninth embodiment of a backlight module according to the present invention.
Figure 10B:
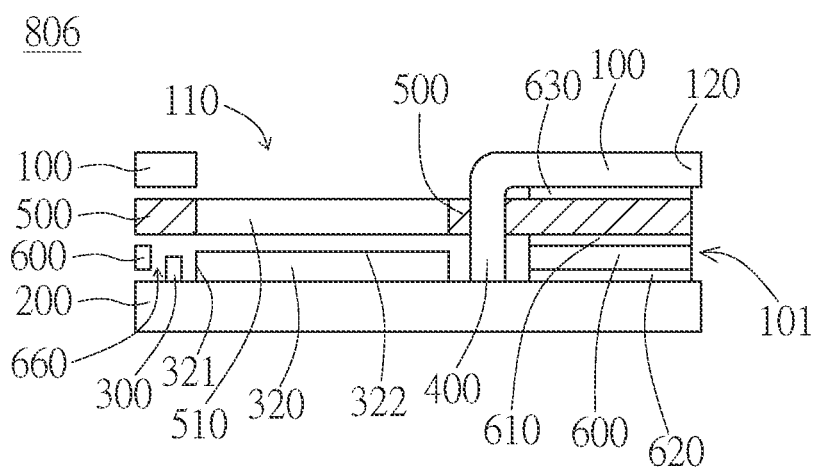

More specifically, in the embodiment shown in FIG. 9B, the backlight module 806 further includes a plurality of light guide sheets 320 (or an integrated one) respectively disposed at one side of one of the light sources 300. Vertical projections of the each light guide sheet 320 and a corresponding light-transmissive portion 510 on the baseplate 100 overlap with a corresponding baseplate hole 110. In other words, each baseplate hole 110 respectively corresponds to one light-transmissive portion 510 and one light guide sheet 320 below. The light provided by the light source 300 is respectively emitted in from a side face 321 of an adjacent light guide sheet 320 and emitted out from a top face 322.

A manner in which the portion of the baseplate 100 extends downward to form the shielding structure 400 may vary according to considerations such as usage or manufacturing. In an embodiment shown in FIG. 10A and FIG. 10B, a portion of the baseplate 100 extends downward to form the shielding structure 400 which is located between the those periphery light sources 300 distributed on the periphery and the spacer 600 and is connected to the lower substrate 200. More specifically, in this embodiment, the shielding structure 400 is a downward bent tongue piece of the baseplate 100 which is formed by for example, stamping. In this way, the shielding structure 400 can prevent the light emitted by the light source 300 from being emitted into the first adhesion layer 610, the second adhesion layer 620, and the third adhesion layer 630, and further prevent the light from being emitted out of the outer edge gap 101, that is, prevent the light from leaking at the side edge of the backlight module 806. An end edge of the shielding structure 400 is connected to the lower substrate 200 in, for example, an abutting or insertion manner.

Figure 11A:
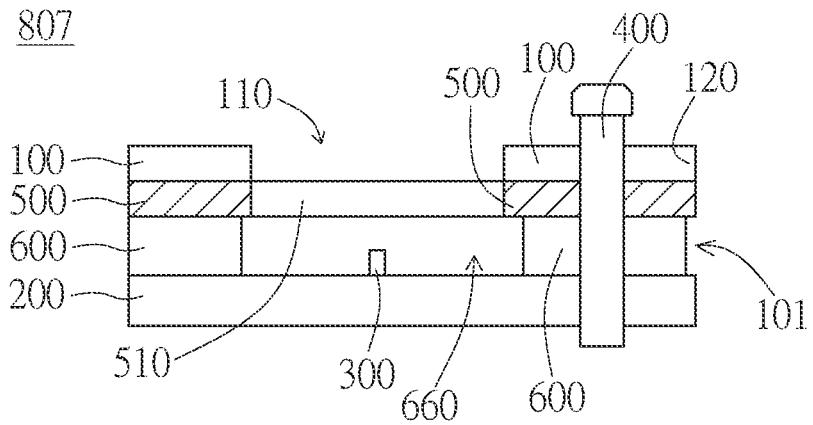
FIG. 11A and FIG. 11B are schematic diagrams of a tenth embodiment of a backlight module according to the present invention.
Figure 11B:
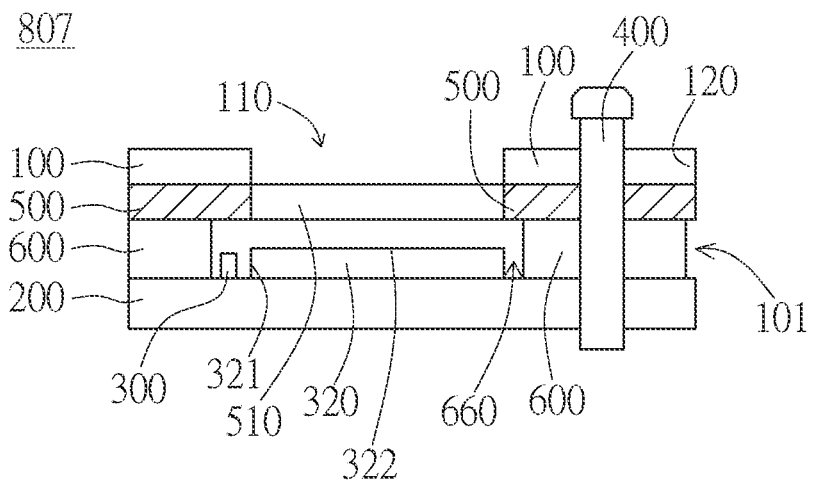

In different embodiments shown in FIG. 11A and FIG. 11B, a backlight module 807 further includes a spacer 600, disposed between a baseplate 100 and a lower substrate 200, and located between those periphery light sources 300 distributed on a periphery and an outer edge 120 of the baseplate 100. A shielding structure 400 of a screw, a rivet, a hot melt glue, or the like penetrates and fixes the baseplate 100, the spacer 600, and the lower substrate 200. In other words, in this embodiment, the fixing effect can be achieved without using an adhesion layer. In this way, there is no adhesion layer for light to pass through, and even though the baseplate 100, the spacer 600, and the lower substrate 200 are not completely sealed, the shielding structure 400 located between the periphery light sources 300 and an outer edge gap 101 can prevent light emitted by the periphery light sources 300 from being emitted out of the outer edge gap 101, that is, prevent the light from leaking at a side edge of the backlight module 807.

In the embodiments shown in FIG. 11A and FIG. 11B, the backlight module 807 further includes a light masking sheet 500 disposed between the baseplate 100 and the spacer 600 and located above the periphery light sources 300. The shielding structure 400 penetrates and fixes the baseplate 100, the light masking sheet 500, the spacer 600, and the lower substrate 200.

In the embodiment shown in FIG. 11A, the baseplate 100 is provided with a plurality of baseplate holes 110, and the light masking sheet 500 is provided with a plurality of light-transmissive portions 510. The light masking sheets 500 may be formed by printing ink on a film, and define the light-transmissive portions 510. Vertical projections of the periphery light sources 300 and the light-transmissive portions 510 on the baseplate 100 overlap with the baseplate holes 110. In other words, each baseplate hole 110 respectively corresponds to one light-transmissive portion 510 and one light source 300 below. However, in different embodiments, based on considerations such as increasing a light-exiting area and improving the light-exiting uniformity, the light source 300 may be used with a light guide element, and may not be disposed right below the baseplate hole 110 and the light-transmissive portion 510.

More specifically, in the embodiment shown in FIG. 11B, the backlight module 807 further includes a plurality of light guide sheets 320 (or an integrated one) respectively disposed at one side of one of the periphery light sources 300. Vertical projections of the each light guide sheet 320 and a corresponding light-transmissive portion 510 on the baseplate 100 overlap with a corresponding baseplate hole 110. In other words, each baseplate hole 110 respectively corresponds to one light-transmissive portion 510 and one light guide sheet 320 below. The light provided by the light source 300 is respectively emitted in from a side face 321 of an adjacent light guide sheet 320 and emitted out from a top face 322.

Figure 12A:
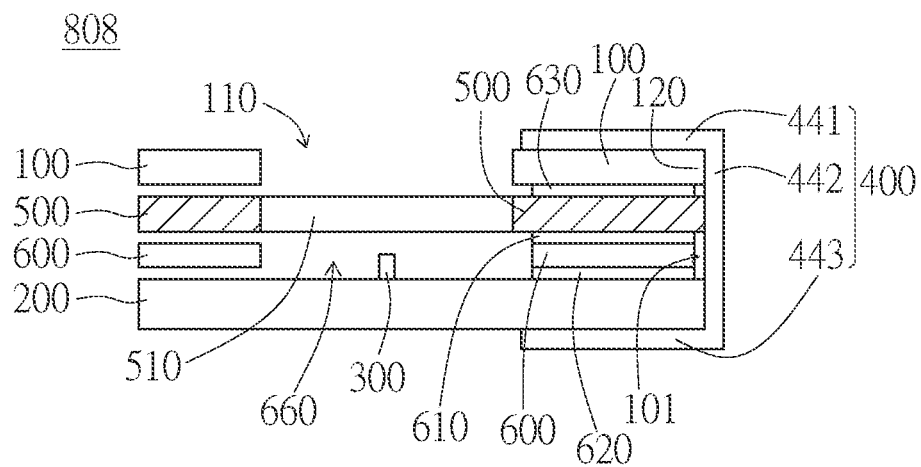
FIG. 12A and FIG. 12B are schematic diagrams of an eleventh embodiment of a backlight module according to the present invention.
Figure 12B:
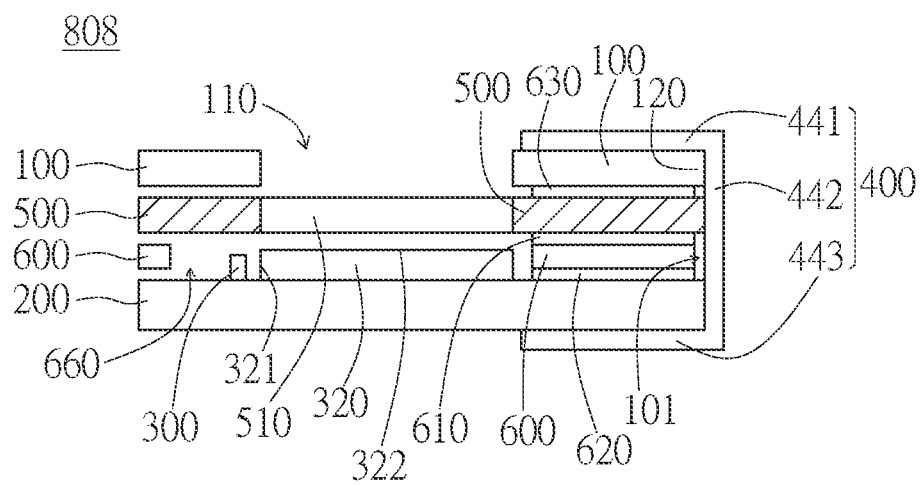

In different embodiments shown in FIG. 12A and FIG. 12B, a shielding structure 400 is a fastener with a U-shaped cross-section, and the shielding structure 400 may be fastened to an outer edge 120 of a baseplate 100 to shield an outer edge gap 101, and enable that opposite end edges of the shielding structure 400 are respectively located on the baseplate 100 and under a lower substrate 200. From a different point of view, an upper portion 441 of the shielding structure 400 is disposed on an upper surface of the baseplate 100, extends outward to exceed the outer edge 120 of the baseplate 100 and then extends downward to form a middle portion 442, and extends downward to exceed the lower substrate 200 and then extends inward to a lower surface of the lower substrate 200 to form a lower portion 443. The upper portion 441 and the lower portion 443 at least partially abut against the upper surface of the baseplate 100 and the lower surface of the lower substrate 200 respectively through rigidity of the shielding structure 400 itself (namely, the upper portion 441 at least partially abuts against the upper surface of the baseplate 100 through the rigidity of the shielding structure 400 itself, and the lower portion 443 at least partially abuts against the lower surface of the lower substrate 200 through the rigidity of the shielding structure 400 itself), so that the shielding structure 400 is fastened and fixed on the outer edge 120 of the baseplate 100. In this way, the shielding structure 400 can prevent the light emitted by the light source 300 from being emitted out of the outer edge gap 101, that is, prevent the light from leaking at a side edge of a backlight module 808.

In an embodiment shown in FIG. 12A, the backlight module 808 further includes a spacer 600, disposed between the baseplate 100 and the lower substrate 200, and located between those periphery light sources 300 distributed on a periphery and the outer edge 120 of the baseplate 100. The backlight module 808 further includes a light masking sheet 500 disposed between the baseplate 100 and the spacer 600. A first adhesion layer 610 is disposed between the light masking sheet 500 and the spacer 600, a second adhesion layer 620 is disposed between the spacer 600 and the lower substrate 200, and a third adhesion layer 630 is disposed between the baseplate 100 and the light masking sheet 500. Further, a common adhesion layer is made of a light-transmissive material, and light emitted by a light source may pass through the adhesion layer. The shielding structure 400 can prevent the light emitted by the light source 300 and passing through the first adhesion layer 610, the second adhesion layer 620, and the third adhesion layer 630 from being further emitted out from the outer edge gap 101 to outside of the side edge of the backlight module 808. The first adhesion layer 610, the second adhesion layer 620, and the third adhesion layer 630 may be further made of a light-proof material, to reduce light to pass through.

In the embodiment shown in FIG. 12A, the baseplate 100 is provided with a plurality of baseplate holes 110, and the light masking sheet 500 is provided with a plurality of light-transmissive portions 510. The light masking sheets 500 may be formed by printing ink on a film, and define the light-transmissive portions 510. Vertical projections of the periphery light sources 300 and the light-transmissive portions 510 on the baseplate 100 overlap with the baseplate holes 110. In other words, each baseplate hole 110 respectively corresponds to one light-transmissive portion 510 and one light source 300 below. However, in different embodiments, based on considerations such as increasing a light-exiting area and improving the light-exiting uniformity, the light source 300 may be used with a light guide element, and may not be disposed right below the baseplate hole 110 and the light-transmissive portion 510.

More specifically, in the embodiment shown in FIG. 12B, the backlight module 808 further includes a plurality of light guide sheets 320 (or an integrated one) respectively disposed at one side of one of the periphery light sources 300. Vertical projections of the each light guide sheet 320 and a corresponding light-transmissive portion 510 on the baseplate 100 overlap with a corresponding baseplate hole 110. In other words, each baseplate hole 110 respectively corresponds to one light-transmissive portion 510 and one light guide sheet 320 below. The light provided by the light source 300 is respectively emitted in from a side face 321 of an adjacent light guide sheet 320 and emitted out from a top face 322.

Figure 13A:
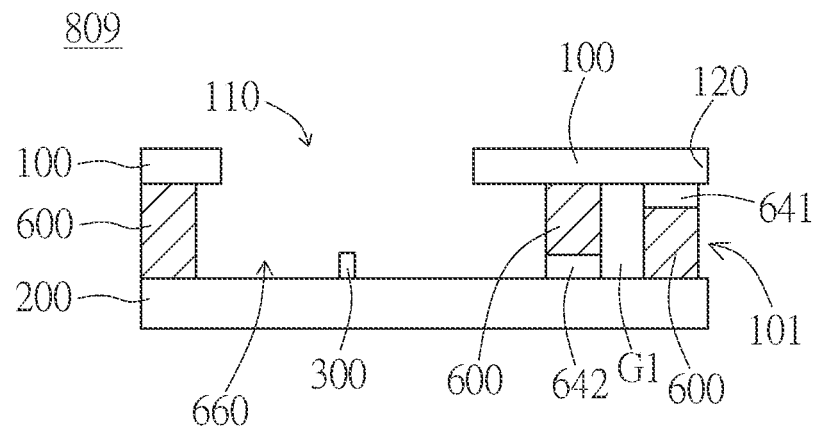
FIG. 13A and FIG. 13B are schematic diagrams of a twelfth embodiment of a backlight module according to the present invention.
Figure 13B:
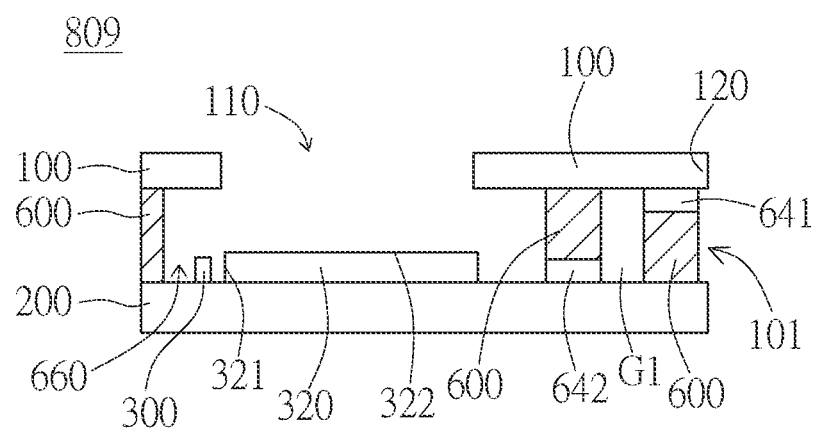

In different embodiments shown in FIG. 13A and FIG. 13B, a shielding structure includes a plurality of spacers 600, and the spacers 600 are staggered up and down between a baseplate 100 and a lower substrate 200 in a near-to-far direction relative to those periphery light sources 300 distributed on a periphery, and are located between those periphery light sources 300 distributed on the periphery and an outer edge 120 of the baseplate 100. Further, the spacers 600 are connected to the baseplate 100 and the lower substrate 200 respectively through a first adhesion layer 641 and a second adhesion layer 642. Because light travels in a straight line, and the first adhesion layer 641 and the second adhesion layer 642 are not on the same straight line relative to the periphery light sources 300, the shielding structure 400 can prevent light emitted by the periphery light sources 300 from being emitted out of an outer edge gap 101, that is, prevent the light from leaking at a side edge of a backlight module 809. The first adhesion layer 641 and the second adhesion layer 642 may be further made of a light-proof material, to reduce light to pass through. On the other hand, in addition that light may attenuate when traveling in a medium, the light may also attenuate due to refraction and partial reflection when entering different media. Therefore, the gaps G1 between the spacers 600 can promote the attenuation of the light. Namely, at least two said spacers 600 may be aligned in series toward the outer edge gap 101 while shifted from each other in a direction not aiming to the outer edge gap 101 (not disposed on the same straight line). Similarly, the at least two adhesion layers 641, 642 may be aligned in series toward the outer edge gap 101 while shifted from each other in a direction not aiming to the outer edge gap 101 (not disposed on the same straight line).

In an embodiment shown in FIG. 13A, the baseplate 100 is provided with a plurality of baseplate holes 110, and vertical projections of the periphery light sources 300 on the baseplate 100 overlap with the baseplate holes 110. In other words, each baseplate hole 110 respectively corresponds to one light source 300 below. However, in different embodiments, based on considerations such as increasing the light-exiting area and improving the light-exiting uniformity, the light source 300 may be used with a light guide element, and may not be disposed right below the baseplate hole 110.

More specifically, in the embodiment shown in FIG. 13B, the backlight module 809 further includes a plurality of light guide sheets 320 (or an integrated one) respectively disposed at one side of one of the periphery light sources 300. Vertical projections of the each light guide sheet 320 and a corresponding light-transmissive portion 510 on the baseplate 100 overlap with a corresponding baseplate hole 110. In other words, each baseplate hole 110 respectively corresponds to one light guide sheet 320 below. The light provided by the light source 300 is respectively emitted in from a side face 321 of an adjacent light guide sheet 320 and emitted out from a top face 322.

Figure 14A:
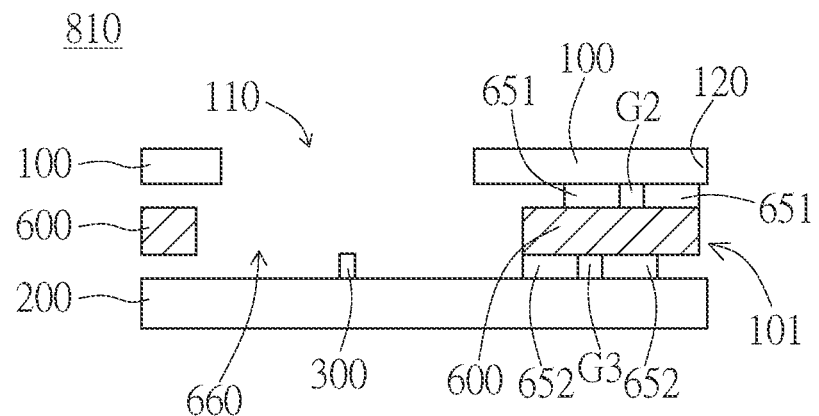
FIG. 14A and FIG. 14B are schematic diagrams of a thirteenth embodiment of a backlight module according to the present invention.
Figure 14B:
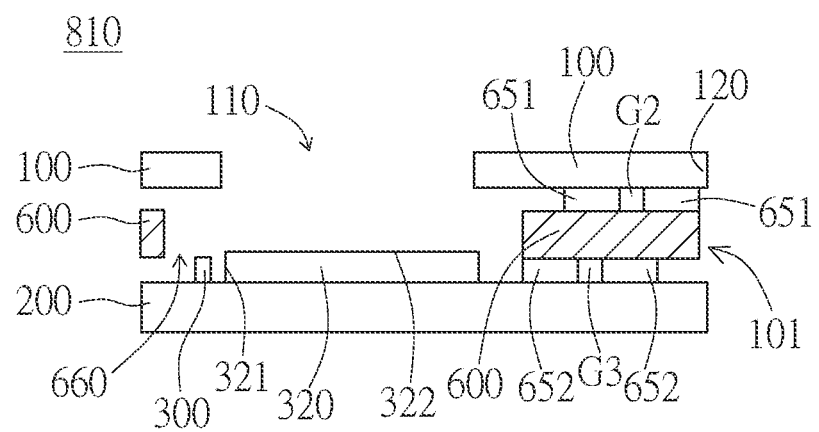

In different embodiments shown in FIG. 14A and FIG. 14B, a shielding structure includes a spacer 600, a plurality of first adhesion layers 651, and a plurality of second adhesion layers 652. The spacer 600 is disposed between a baseplate 100 and a lower substrate 200, and is located between those periphery light sources 300 distributed on a periphery and an outer edge 120 of the baseplate 100. The first adhesion layers 651 are disposed between the spacer 600 and the baseplate 100, and at least one gap G2 is located between the first adhesion layers 651. The second adhesion layers 652 are disposed between the spacer 600 and the lower substrate 200, and at least a gap G3 is located between the second adhesion layers 652. Further, in addition that light may attenuate when traveling in a medium, the light may also attenuate due to refraction and partial reflection when entering different media. Therefore, the air gaps G2, G3 between the first adhesion layers 651 and between the second adhesion layers 652 can promote the attenuation of the light. In this way, the shielding structure 400 can prevent the light emitted by the light source 300 from being emitted out of the outer edge gap 101, that is, prevent the light from leaking at a side edge of a backlight module 810. The first adhesion layer 651 and the second adhesion layer 652 may be further made of a light-proof material, to reduce light to pass through. Certainly, at least one of the spacer(s) 600 and the adhesion layers 641/642, 651/652 in FIG. 13A, 13B, 14A, or 14B may be opaque to work as the shielding structure 400 to block light toward the outer edge gap 101.

In an embodiment shown in FIG. 14A, the baseplate 100 is provided with a plurality of baseplate holes 110, and vertical projections of the periphery light sources 300 on the baseplate 100 overlap with the baseplate holes 110. In other words, each baseplate hole 110 respectively corresponds to one light source 300 below. However, in different embodiments, based on considerations such as increasing the light-exiting area and improving the light-exiting uniformity, the light source 300 may be used with a light guide element, and may not be disposed right below the baseplate hole 110.

More specifically, in the embodiment shown in FIG. 14B, the backlight module 810 further includes a plurality of light guide sheets 320 (or an integrated one) respectively disposed at one side of one of the periphery light sources 300. Vertical projections of the each light guide sheet 320 and a corresponding light-transmissive portion 510 on the baseplate 100 overlap with a corresponding baseplate hole 110. In other words, each baseplate hole 110 respectively corresponds to one light guide sheet 320 below. The light provided by the light source 300 is respectively emitted in from a side face 321 of an adjacent light guide sheet 320 and emitted out from a top face 322.

The present invention has been described in the foregoing related embodiments, but the foregoing embodiments are only examples for implementing the present invention. It should be pointed out that the disclosed embodiments do not limit the scope of the present invention. On the contrary, modifications and equivalent arrangements included in the spirit and scope of the claims are all included in the scope of the present invention.

What is claimed is:

1. A backlight module configured underneath a baseplate beneath a plurality of key units, the backlight module comprises:
   a lower substrate disposed below the baseplate and comprising a circuit layer, wherein there is an outer edge gap between an outer edge of the baseplate and the lower substrate;
   a spacer, disposed between the lower substrate and the baseplate, having at least one spacer hole;
   a plurality of periphery light sources connecting with the circuit layer and located within the at least one spacer hole, disposed between the baseplate and the lower substrate, and disposed along a periphery of the baseplate, each of the periphery light sources disposed in optical communication with at least one baseplate hole of the baseplate, light provided by each of the periphery light sources passing through a corresponding one of the baseplate holes to illuminate a corresponding one of the key units;
   a shielding structure, disposed outside said periphery light source, to block light provided by the periphery light sources from emitting out of the outer edge gap; and
   a light masking sheet disposed between the baseplate and the periphery light sources, wherein a portion of the light masking sheet further extends upward or downward, or upward and downward respectively to form the shielding structure to shield the outer edge gap.

2. The backlight module according to claim 1, wherein the extended portion of the light masking sheet extends out of the outer edge gap to form the shielding structure to shield the outer edge gap.

3. The backlight module according to claim 2, wherein a portion of the light masking sheet extending out of the outer edge gap further bents downward to cover underneath the lower substrate, or further bents upward to cover the outer edge gap and further extend to cover underneath the baseplate, or cover the outer edge of the baseplate, or cover above the baseplate.

4. The backlight module according to claim 2, wherein a shielding wall formed by a bent portion of the light masking sheet proximate to the peripheral light source is configured wide enough to block light toward at least one direction, or configured as a continuous wall surrounding all lateral sides of the peripheral light source to block lights emitted towards any directions within a range of 360 degrees.

5. The backlight module according to claim 1, further comprising a first adhesion layer disposed on a top surface of the spacer, and comprising a second adhesion layer disposed on a bottom surface of the spacer, wherein the shielding structure shields edges of the first adhesion layer and the second adhesion layer to block light.

6. The backlight module according to claim 1, further comprising at least one light guide sheet disposed adjacent to at least one of the periphery light sources for guiding light, wherein a vertical projection of the baseplate hole overlaps with the light guide sheet, and the shielding structure blocks light emitted out of a lateral side of the light guide sheet.

7. A luminous keyboard, comprising:
   a key module, comprising the plurality of key units and the baseplate according to claim 1, wherein the plurality of key units are disposed on the baseplate; and
   the backlight module according to claim 1.

8. A backlight module configured underneath a baseplate beneath a key unit, the backlight module comprises:
   a lower substrate, disposed under the baseplate and comprising a circuit layer;
   a spacer, disposed between the lower substrate and the baseplate, the spacer having a spacer hole, wherein an outer edge gap is configured between outer edges of the spacer, the baseplate and the lower substrate;
   a light masking sheet disposed between the baseplate and the spacer:
   a periphery light source connecting with the circuit layer and located within the spacer hole, the periphery light source being disposed adjacent to a periphery of the baseplate; and
   a light guide sheet, disposed within the spacer hole and adjacent to the periphery light source, wherein the light guide sheet overlaps with a light-transmissive portion of the light masking sheet for guiding light through the light masking sheet, and the light-transmissive portion does not overlap with the periphery light source;

wherein the spacer blocks light emitted from the periphery light source and/or the light guide sheet;

wherein a portion of the light masking sheet further extends upward or downward, or upward and downward respectively to form a shielding structure to shield the outer edge gap and block light from emitting out of the outer edge gap.

\* \* \* \* \*